(12) United States Patent
Finschi et al.

(10) Patent No.: US 10,306,411 B2
(45) Date of Patent: May 28, 2019

(54) EVACUATION OF BUILDINGS WITH ELEVATOR SYSTEMS

(71) Applicant: INVENTIO AG, Hergiswil (CH)

(72) Inventors: Lukas Finschi, Ebikon (CH); Florian Troesch, Zurich (CH)

(73) Assignee: Inventio AG, Hergiswil (CH)

( * ) Notice: Subject to any disclaimer, the term of this patent is extended or adjusted under 35 U.S.C. 154(b) by 0 days.

(21) Appl. No.: 15/748,985

(22) PCT Filed: Jul. 26, 2016

(86) PCT No.: PCT/EP2016/067807
§ 371 (c)(1),
(2) Date: Jan. 30, 2018

(87) PCT Pub. No.: WO2017/021223
PCT Pub. Date: Feb. 9, 2017

(65) Prior Publication Data
US 2019/0020978 A1 Jan. 17, 2019

(30) Foreign Application Priority Data
Jul. 31, 2015 (EP) .................................... 15179310

(51) Int. Cl.
*H04W 4/024* (2018.01)
*H04W 4/33* (2018.01)
(Continued)

(52) U.S. Cl.
CPC ............. *H04W 4/024* (2018.02); *B66B 3/006* (2013.01); *B66B 5/021* (2013.01); *G01C 21/206* (2013.01);
(Continued)

(58) Field of Classification Search
CPC ....... H04W 4/024; H04W 4/33; H04W 4/029; H04W 4/90; B66B 3/006; B66B 5/021;
(Continued)

(56) References Cited

U.S. PATENT DOCUMENTS 7,242,303 B2 7/2007 Patel et al.
2007/0001904 A1 1/2007 Mendelson
(Continued)

FOREIGN PATENT DOCUMENTS

DE 10304073 A1 9/2004
DE 102013201873 A1 8/2014

OTHER PUBLICATIONS

Pu, S. And Zlatanova, S., "Evacuation Route Calculation of Inner Buildings", in P.J.M. van Oosterom, S. Zlatanova & E.M. Fendel (eds), Geo-Information for Disaster Management, 2005, Heidelberg: Springer Verlag, 1143-1161.

*Primary Examiner* — Sisay Yacob
(74) *Attorney, Agent, or Firm* — Baker & Hostetler LLP (57) ABSTRACT

During an evacuation situation in a building that is equipped with an elevator system and in which a plurality of fixed point markers are arranged at defined sites, an escape route is transmitted to a person by means of a mobile device. The fixed point markers store data that can be received by the mobile device. An instantaneous position of the mobile device can be determined when the mobile device uses data received from a fixed point marker to access a database in which the data is linked to a site of the fixed point marker. The ascertainment of the escape route to a destination is based on the instantaneous position of the mobile device. The person is registered on reaching the destination when the mobile device is detected at the destination.

17 Claims, 4 Drawing Sheets

(51) Int. Cl.
  *H04W 4/90* (2018.01)
  *H04W 4/029* (2018.01)
  *G08B 7/06* (2006.01)
  *B66B 5/02* (2006.01)
  *G06Q 90/00* (2006.01)
  *G01S 1/68* (2006.01)
  *G01C 21/20* (2006.01)
  *B66B 3/00* (2006.01)

(52) U.S. Cl.
  CPC .............. *G01S 1/68* (2013.01); *G06Q 90/205* (2013.01); *G08B 7/066* (2013.01); *H04W 4/029* (2018.02); *H04W 4/33* (2018.02); *H04W 4/90* (2018.02); *B66B 5/022* (2013.01); *B66B 5/024* (2013.01); *B66B 5/025* (2013.01)

(58) Field of Classification Search
  CPC ......... B66B 5/022; B66B 5/024; B66B 5/025; G01C 21/206; G01S 1/68; G06Q 90/205; G08B 7/066
  See application file for complete search history.

(56) References Cited

U.S. PATENT DOCUMENTS

| | | |
|---|---|---|
| 2010/0109864 A1 | 5/2010 | Haartsen et al. |
| 2010/0121567 A1* | 5/2010 | Mendelson .......... G01C 21/206 701/467 |
| 2013/0310081 A1 | 11/2013 | Chu |
| 2014/0253326 A1 | 9/2014 | Cho et al. |
| 2015/0170503 A1 | 6/2015 | Wedig et al. |
| 2016/0072581 A1* | 3/2016 | Ikehara ................. H04W 4/02 398/118 |

* cited by examiner

Fig. 5

EVACUATION OF BUILDINGS WITH ELEVATOR SYSTEMS

CROSS-REFERENCE TO RELATED APPLICATION

This application is the national phase application under 35 U.S.C. § 371 claiming the benefit of priority based on International Patent Application No. PCT/EP2016/067807, filed on Jul. 26, 2016, which claims the benefit of priority based on European Patent Application No. 15179310.6, filed on Jul. 31, 2015. The contents of each of these applications are herein incorporated by reference.

FIELD OF THE INVENTION

The technology described here relates in general to the evacuation of an area, in particular a multi-story building, in which an elevator system is present. Embodiments of the technology pertain to a method and system for evacuating an area.

BACKGROUND OF THE INVENTION

A method for evacuating a building is disclosed, for example, in DE 10 2013 201 873 A1. According to this method, the place of a mobile device and, therewith, the location of a person bearing the mobile device within a building are determined with the aid of an indoor positioning system (WLAN nodes, hotspots, access points). The mobile device reads the building plan from identifiers (QR codes or bar codes) installed in the building. Available escape paths are determined in accordance with the determined position. An escape route, e.g., the fastest path from the current location to the nearest passable emergency exit, is determined for the person from the determined location and the available escape paths. The calculated escape route is represented graphically on the mobile device. For wheelchair users, the method provides guidance to a safe place in the building—in order to wait there for a rescue team—through evacuation information.

Although DE 10 2013 201 873 A1 does disclose a solution whereby an escape route is communicated graphically to a person on the mobile device, this solution does not take into consideration changing conditions during an evacuation situation. There is a need for an improved technology for evacuating an area, with which people can be evacuated safely and efficiently from the area, even if the conditions change during an evacuation, for example, due to panicking or a rapidly spreading fire.

SUMMARY OF THE INVENTION

One aspect of such an improved technology therefore relates to a method for controlling a safety system for guiding a person during an evacuation situation in an area equipped with an elevator system. In the area, a plurality of fixed point markers are arranged at defined sites, wherein the fixed point markers store data (identifiers) that can be read by a mobile device carried by the person. The method comprises determining an instantaneous position of the mobile device in the area when the mobile device uses data received from a first fixed point marker to access a database in which the data is linked to a site of the first fixed point marker. The method comprises ascertaining an escape route in the area to a destination on the basis of the instantaneous position of the mobile device, and transmitting escape route information to the mobile device. The method comprises registering the person on arrival at the destination, when the mobile device is detected at the destination by means of a second fixed point marker.

Another aspect relates to a system for guiding a person during an evacuation situation in an area equipped with an elevator system. The system has a plurality of fixed point markers at defined sites, wherein the fixed point markers store data (identifiers) that can be received by a mobile device carried by the person. The system also comprises a safety system having a computer system. The computer system runs a software program that determines an instantaneous position of the mobile device in the area when the mobile device uses data received from a first fixed point marker to access a database in which the data is linked to a site of the first fixed point marker. The software program ascertains an escape route in the area to a destination, the ascertainment being based on the instantaneous position of the mobile device. The software program also transmits escape route information to the mobile device, and registers the person on arrival at the destination when the mobile device is detected at the destination by means of a second fixed point marker.

In the embodiments described here, not only is the escape route communicated to the person to be evacuated, but there is also monitoring of whether the person also actually arrives at the destination and is registered there as "evacuated." This ensures that the person has left the danger area and has also actually arrived at the destination—not merely that the person has received the communication of the escape route. For a rescue team, it is important, for example, to know whether the team must search for this person in the area if the person is still not regarded as "evacuated" after a fixed time.

For when the rescue team must search for this person, the technology described here assists in locating the person. Because the escape route information has been transmitted to the mobile device, the last known whereabouts of the person in the area are very likely to be the last determined position of the mobile device.

It is also important for rescue services to know how many people are present in the area. In the ideal case, i.e., that each mobile device is switched on and the Bluetooth function has been activated in each case, the technology makes it possible to determine the instantaneous position of each one of the mobile devices in the area and therewith to ascertain the number of mobile devices. If the people considered "evacuated" are counted, it is possible to estimate how many people are still in the area. For people who have a plurality of mobile devices, information pertaining thereto may have been already recorded in advance, and used during the evacuation, for example, for improved positioning. In such a situation, the position of that device or those devices that is/are actually moving is used. This makes it possible to recognize, for example, abandoned devices as being such.

In one embodiment, a change in location of the mobile device is tracked by determining new positions of the mobile device. This happens along the escape route communicated thereto, i.e., until registration at the destination. In one embodiment of the technology, a deviation from the escape route may be recognized, for example, when the person has gotten lost in the area, or the situation in the area has changed in such a manner that the originally planned escape route is no longer available, for example, because the escape route has been blocked in the meantime. If a deviation from the escape route is recognized, the escape route may be updated and/or this may be indicated as soon as possible to the person. This makes it possible to prevent wasting of valuable time. This, and possibly necessary updating of the escape route, may contribute to conveying a greater sense of safety to the person, and reducing the risk of panic.

The technology also makes it possible to determine a person-specific escape route, i.e., any physical limitations that the person to be evacuated may possibly have can be taken into account when the escape route is being determined. For this purpose, the method may comprise accessing a stored user profile of the person, in which any physical limitations that the person may have are stored. If, for example, walking ability is limited, such that the person needs to use a wheelchair, the escape route must not include any stairs; instead, in such a case, use of the elevator system is included in the planning of the escape route. The planning may be such that an elevator car is moved to the floor on which the escape route proceeds, so that it is, for example, already ready to be boarded when the person arrives there. If, on the other hand, vision is impaired, the escape route information is transmitted to the mobile device with a control command so that the escape route information is communicated audibly to the person.

The technology in one embodiment uses a current building situation in order to ascertain a safe escape route. For this purpose, in this embodiment, the building has present therein a system of sensors with which situation parameters can be ascertained. During an emergency, the situation is subject to change at any time, because, for example, a fire has spread out and previously available escape routes are no longer available. The situation parameter(s) determined—in one embodiment—provide(s) insight about the building situation (for example, whether accesses to the elevators are free and whether the elevators themselves are usable), and may be taken into consideration when the escape route is being ascertained.

In one embodiment, evacuation information may be sent to each mobile device of which the instantaneous position has been determined. The evacuation information is individual for one mobile device, and comprises instructions for a person with whom this mobile device is associated. The evacuation information may, for example, provide notification that there is an emergency, that evacuation of the building has started, that there is no danger on the floor on which the person is present, that the person should not yet go to the elevator but instead after "x" minutes, and/or that the person should proceed immediately to the elevator indicated. The evacuation information may also inform the person that a nearby stairwell is accessible and the person, if able to use stairs, may possibly reach the destination faster than with an elevator.

BRIEF DESCRIPTION OF THE DRAWINGS

Various aspects of the improved technology are explained in more detail below using exemplary embodiments in conjunction with the figures. Like elements have like reference characters in the figures. In the drawings.

DETAILED DESCRIPTION OF EMBODIMENTS OF THE INVENTION

Figure 1:
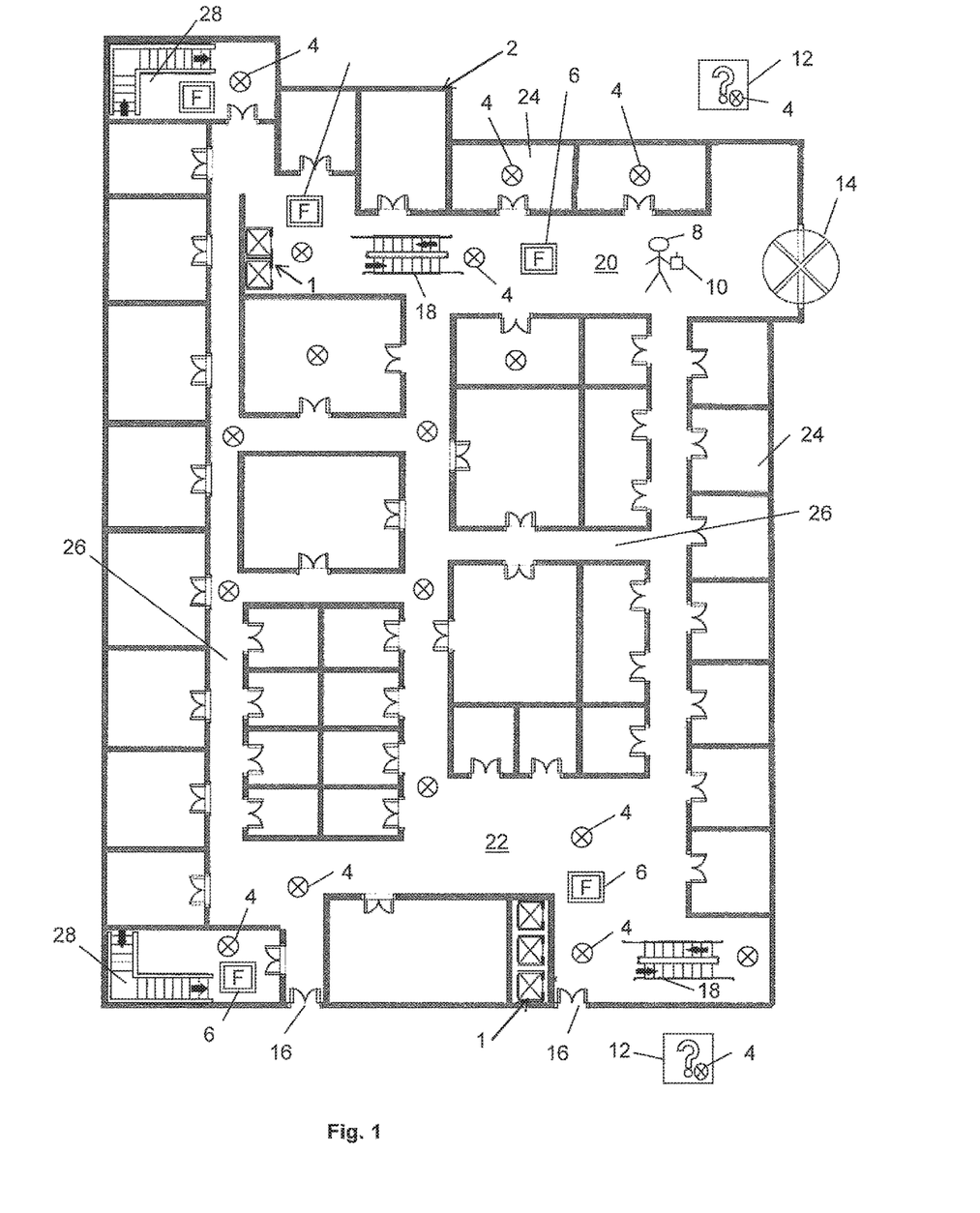
FIG. 1 illustrates a schematic representation of an example of a situation on a building floor served by two elevator systems.

FIG. 1 is a schematic representation of an example of a situation on a floor of a building 2 that is to be entirely or partially evacuated safely and efficiently during an emergency (e.g., a fire, a natural catastrophe, or a terror situation). The term "evacuation" is to be understood here to mean clearing out an area, wherein the area may be a building, a part of a building, a building with an adjoining site, or another structure (e.g., a ship) suitable for visitation by people. People who are staying in an area to be evacuated must leave the area or at least go to a destination that is provided there and considered safe. The technology described here is not limited to evacuation of buildings (e.g., apartment homes, offices and corporate buildings, hotels, sports arenas, airport buildings, and factories). A person skilled in the art will recognize that the technology can also be used, for example, to evacuate other structures (e.g., ships). In the following embodiments, the building 2 is the area to be evacuated.

The building 2 can be entered and left through a main entrance 14 and two side entrances 16. Depending on the design, the side entrances 16 may also be provided emergency exits, and thus exclusively for use during an emergency. Outside of the building 2, near these entrances 14, 16, are gathering points at which people are to turn up after leaving the building 2 in an emergency, in order to be registered there as having been "evacuated." For the people, the gathering points 12 represent destinations at the end of escape routes. The gathering points 12 may be installed permanently in an environment of the building 2. The gathering point 12 may also be set up as temporary in the environment, as necessary, for example, during an evacuation situation, for example, fixed to a stand or a vehicle.

Alternatively to the aforementioned possibility of registering evacuated people as having been "evacuated" at the gathering points 12, there may be corresponding devices (for example, the beacons described herein below) provided at the entrances 14, 16 of the building 2 and/or at special checkpoints or turnstiles within the building 2, in order to recognize people as being present at these places and register them as having been "evacuated." It is also possible to install such devices in elevator cars 49 (see FIG. 4) and/or entrances thereof, in order, for example, to recognize people leaving an elevator car. This makes it possible, for example, to establish that a person has arrived, for example, at a "safe" floor.

The main entrance 14 leads to an entrance area 20, and the side entrances 16 lead to an entrance area 22. The entrance areas 20, 22, are also called lobbies 20, 22 (respectively) herein below. From each lobby 20, 22, a person 8 has access to an elevator system 1, an escalator installation 18, and a stairwell 28, in order to reach another floor. From the lobbies 20, 22, the person 8 also has access to halls and corridors 26 and individual rooms 24.

Within the building 2, FIG. 1 also illustrates emergency alarms 6 of an alarm system that has, for example, devices for detecting temperature, smoke, and/or gas and optionally triggers an alarm. Herein below, the emergency alarms 6 are fire alarms (6) of a fire alarm system. For the purpose of better viewing, FIG. 1 depicts fire alarms 6 only in the stairwells 28 and the lobbies 20, 22. It shall, however, be understood that a plurality of these fire alarms 6 are arranged in accordance with any existing fire protection regulations in the rooms 24, the halls and corridors 26, and the elevator systems 1 (e.g., in an elevator shaft 38 illustrated in FIG. 4), and connected by means of a network to a fire alarm control center (not shown) and/or a building management system 42 illustrated in FIG. 2. The arrangement of the fire alarms 6 and the interconnection thereof may be documented in a building plan or building model. The communication in this network takes place in one embodiment according to a network protocol for building automation, for example, the BACnet (Building Automation and Control Networks). Fire alarm systems and components thereof, e.g., fire alarms 6, are generally known, such that further elaboration thereof is not needed here.

In addition to such fire alarm systems, the building 2 also, under certain circumstances, has sensors that are provided for detecting or observing different events and may also be documented in the building plan or building model. For example, motion sensors may be arranged distributed through the building 2. Moreover, video cameras 11 (see FIG. 4) may be arranged, for example, in the halls and corridors 26, the entrances 14, 16, and in the lobbies 20, 22. Security personnel or an image processing system may, for example, evaluate images captured by the video cameras 11, in order to assess the current situation in individual areas in the building 2, for example, whether a hall or corridor 26 is blocked or accessible, whether there is a gathering/congestion of people at a place, and/or what the extent of a fire reported there is. The signals of the sensors and the evaluation of the recorded events may, in connection with signals from the fire alarms 6, provide current situation parameters that, for example, provide insight on whether the accesses to the elevators are free and whether the elevators themselves are usable. Signals generated from the fire alarms 6 and the sensors and the evaluation thereof may be taken into account in the determination of an escape route, as described herein below.

FIG. 1 also illustrates a plurality of fixed point markers 4 that are arranged at different places within the building 2. The fixed point markers 4 are arranged, for example, in areas that the person 8 can visit, examples thereof including the rooms 24, the corridors and halls 26, the stairwells 28, and the lobbies 20, 22. Also, for the purpose of better visibility, FIG. 1 only illustrates some of the fixed point markers 4, and only some thereof are provided with reference signs. As illustrated in FIG. 1, fixed point markers 4 are also present at the gathering points 12. The arrangement of the fixed point markers 4 may also be documented in a building plan or building model. The gathering points 12 may, alternatively thereto, be only temporarily equipped with fixed point markers 4, as needed. As mentioned above, the gathering points 12 may, as necessary, be set up temporarily and movably at a safe place, e.g., in the environs of the building 2. This may be advantageous if a location of a gathering point 12 and the number thereof need to be set up flexibly and, for example, in accordance with the type and/or scale of the emergency and the number of people to be evacuated.

In one embodiment, a mobile device 10 carried by the person 8 is configured in order to receive data from a fixed point marker 4 (e.g., an identification number thereof), by means of which data an instantaneous location of the mobile device 10 can be determined. The receipt occurs without contact, e.g., through scanning of an optical code (e.g., a QR code, bar code, or color code), or production of a radio link based on one of the known technologies for near field communication (NFC), Wi-Fi Direct, RFID, or Bluetooth.

Hereinafter, the mobile device 10 is a Bluetooth-capable smartphone, and the fixed point markers 4 are also accordingly Bluetooth-capable. A fixed point marker 4 is therefore hereinafter called a "beacon 4" or "Bluetooth beacon 4." The communication between the smartphone (10) and the beacons 4 thus takes place according to the Bluetooth standard, e.g., the Bluetooth Standard 4.0 (Bluetooth Low Energy (BLE)) or another Bluetooth standard.

Irrespective of the standard selected, a beacon 4 always emits the same data, e.g., the identification number thereof (e.g., "ID=5"). If the mobile device 10 is in the radio range of the beacon (with the Bluetooth function activated), a communication link is automatically established, and the mobile device 10 receives the emitted data, and recognizes thereby that it is, for example, in the vicinity of the beacon 4 with the "ID=5." Correspondingly, the connection is interrupted if the mobile device 10 moves back out of the radio range. A person skilled in the art will recognize that pairing known from Bluetooth technology is not provided in one embodiment, for example, due to the large number of beacons 4 distributed through the building 2, and any (one-time) visitors who may be visiting the building 2. If, however, it should be provided, then it is accepted here that a first communication contact (i.e., the pairing) has already occurred between the mobile device 10 and the beacons 4. In the pairing, the communication partners exchange characteristic data so as to automatically recognize each other again the next time.

Figure 2:
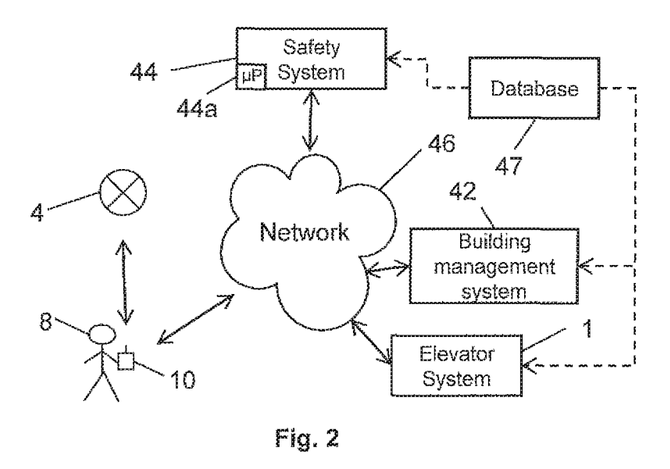
FIG. 2 illustrates a schematic representation of an example of a communication system for evacuation of a building.

FIG. 2 illustrates the interactions of the mobile device 10 with the beacon 4 and with systems (1, 42, 44) coupled to a communication network 46. In one embodiment, each beacon 4 stores an individual identifier (e.g., "ID=5") that is transmitted to the mobile device 10 when there is a communication link. The mobile device 10 (or an installed software application) uses the received identifier of a beacon 4 to access, by means of a radio link, a database 47 in which the identifier is linked to data on a site at which this beacon 4 is arranged (e.g., "ID=5" in the lobby 20 at the access to the escalator installation 18). The identifier of the beacons 4 and the data on the location thereof form a data set in the database 47. The number of such data sets corresponds to the number of the beacons 4. The database 47 may be present in a storage system of a building management system 42 (building controller) or a storage system of a separate safety system 44 (security system) of the elevator system 1. This is indicated in FIG. 2 with dotted lines between the database 47 and the systems 1, 42, 44. The access to the database 47 may take place over the communication network 46 (e.g., WLAN, Internet), during which an identification parameter (e.g., telephone number and/or device ID code (Media Access Control (MAC) address)) of the mobile device 10 accessing the database 47 is also transmitted.

In the view of the building management system 42 or the safety system 44, on the one hand, it is recognized—with the access to the database 47—which mobile device 10 is present in the vicinity of the beacon 4 with "ID=5." On the other hand, the mobile device 10 acquires data pertaining to the location of this beacon 4 and therewith its own location. If the person 8 moves within the building 2, including use of the elevator system 1 or the escalator installation 18, the process described repeats once there is a communication link between the mobile device 10 and another beacon 4. In the view of the building management system 42 or the safety system 44, this makes it possible to track the movement of the mobile device 10. In the view of the person using the mobile device 10, in the case of evacuation, this enables orientation or at least provides an orientation aid, for example, because the mobile device 10 of the person 8 conveys perceivable location information to the person.

A person skilled in the art will recognize that the interactions described in connection with FIG. 2 constitute a type of sensor function. The safety system 44 may—for example, from the number of accesses to the database 47—deduce how many passenger transports are prevailing at the moment in the building 2, how many and few passenger transports are prevailing, in which directions the transport is moving (both in the horizontal direction and in the vertical direction), and where the transport may possibly come to a standstill (e.g., a plurality of mobile devices 10 use the identifier of the same beacon 4 to access the database 47 (possibly repeatedly) but do not move to another beacon 4). This information may also be utilized as a current situation parameter for calculating the escape route.

In one embodiment, the mobile device 10 has installed thereon a software application (app) that supports the communication with the beacons 4 and the units (1, 42, 44) coupled to the communication network 46. Authorized people (e.g., regular users of the building 2) may pre-install the app on their mobile device 10. A visitor may, on entering the building 2, receive an offer to download the app on his or her mobile device 10.

The app also controls a user interface (comprising, e.g., a touch-sensitive display) with which, for example, location and/or escape route information can be conveyed to the person 8. The location and/or escape route information may be represented in readable form on the display, e.g., in the form of text and/or one or more symbols. The information may also be represented alone or in connection with a representation of the building plan or model. In addition or alternatively thereto, the location and/or escape route information may also be conveyed acoustically to the person 8, so that, for example, even people with limited vision can receive the location information and react accordingly.

Figure 3:
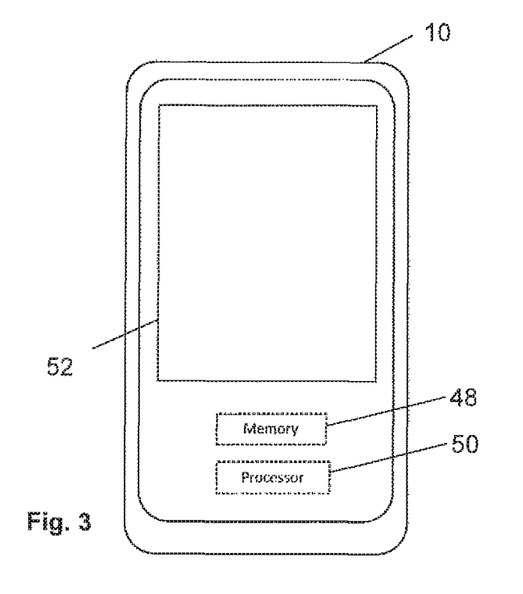
FIG. 3 illustrates a schematic representation of a mobile device that can indicate escape route information.

FIG. 3 illustrates a smartphone as an example of a mobile device 10. Arranged therein are a storage device 48 (memory) and a process 50, under a display 52 (touch screen) so as not to be visible from the outside (and therefore indicated with dotted lines). With the aid of the user interface, the person 8 can make individual adjustments to the settings and desired functions on the mobile device 10. The Bluetooth function may, for example, be activated and deactivated; the latter, for example, for the protection of privacy, because the movements and whereabouts of the person 8 in the building 2 cannot be tracked without the Bluetooth function. Moreover, the aforementioned app may be activated and deactivated by the person 8. In the emergency, for example, with a fire alarm, the person 8 may activate the Bluetooth function and the app. Depending on the design, the app may be activated automatically, or always be activated when the mobile device 10 is turned on.

The smartphone, as an example of a mobile device 10, conveys escape route information to the person 8. The escape route information may, in one embodiment, be indicated on the display 52, e.g., as text, graphic symbols (e.g., arrows), maps, and/or images of places. The escape route information informs or instructs the person 8, for example, about where he or she should go next, and/or how great the distance to the next waypoint or exit is. If the escape route includes use of the elevator system 1, it may also be conveyed to the person 8, for example, which elevator should be used, when it is arriving at a certain floor, and/or how long the waiting time to the arrival of an elevator car is. In addition or alternatively thereto, the information may also be presented to the person 8 as an audio message. A person skilled in the art will recognize that the escape route information may also be conveyed to the person 8 by means of so-called smartwatches or other wearables (e.g., eyeglasses with a display, possibly in connection with technology that enables an augmented reality function).

Figure 4:
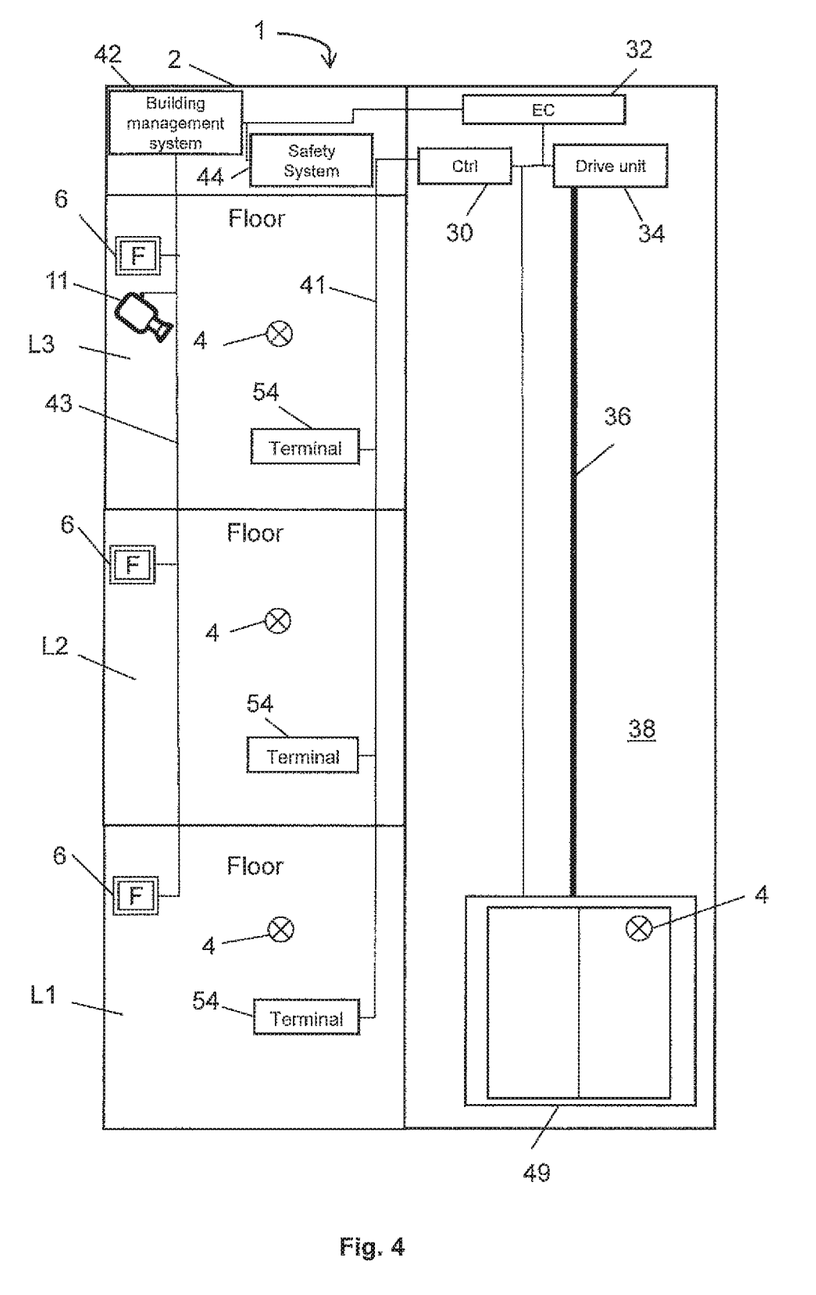
FIG. 4 illustrates a schematic representation of a part of the building with an embodiment of an elevator system.

For an understanding of the vertical situation in the building 2, FIG. 4 illustrates a side view of a part of the building 2 illustrated in FIG. 1, with one embodiment of the elevator system 1. The building 2 has a plurality of floors L1, L2, L3, on each of which a plurality of fire alarms 6 and beacons 4 have been arranged. In addition, a beacon 4 is arranged in an elevator car 49, so that, for example, it can also be recognized that the person 8 is present at the moment in the elevator car 49 and that the elevator car 49 is traveling to a "safe" floor. This makes it possible to determine the number of people in the elevator car 49. The elevator system may use this information in order to, for example, ascertain whether and for how many more people there is still room in the elevator car 49. The direction of travel and the destination floor are present in the elevator system 1 as information. The fire alarms 6 are here interconnected through a network 43 of a fire alarm system to the building management system 42, in which a fire alarm central command may also be integrated. In the embodiment illustrated, the video camera 11 is also coupled to the network 43, wherein at least one video camera 11 may be arranged on each floor L1, L2, L3. The floors L1, L2, L3 are served by the elevator system 1, i.e., the person 8 can be transported by the elevator system 1 from a boarding floor to a destination floor. The vertical situation of the building 2 is also documented in the building plan or building model.

FIG. 4 does not include an illustration of the escalator installations 18 illustrated in FIG. 1; however, it shall be understood that an escalator installation 18 also serves to vertically transport people. Each escalator installation 18 has its own control device, which may have a communication link to the building management system 42 and/or the safety system 44. In an emergency, this makes it possible to set the escalator installation 18 in a fixed operating mode (including being stationary). In one operating mode, an escalator installation 18 may be controlled with respect to the direction of travel thereof so as, for example, to make available a greater transport capacity in the direction of the exit or the destination in the currently necessary direction in accordance with the transport need.

The elevator system 1 illustrated in FIG. 4 is, for example, equipped with a destination call control, wherein destination calls can be made via terminals 54 installed on the floors L1, L2, L3. The function of the destination call control is implemented in the embodiment illustrated in a control device (Ctrl) 30, but can also be entirely or partially implemented in an elevator control 32. The control device 30 and the elevator control 32 may be combined into one control device (30, 32). The elevator control 32 is, in the embodiment illustrated, also communicatively connected to the building management system 42 and the safety system 44. The elevator control 32 also controls a drive unit 34 that transports the elevator car 49 in the shaft 38 by means of a support means 36.

In one embodiment, a destination call may be placed with the aid of an information carrier, e.g., in the form of a credit card or an employee ID. Depending on the design, a memory chip that can be externally contacted, an RFID transponder in conjunction with a memory chip, or an externally optically readable code, e.g., a QR code or bar code, is located in or on the information carrier. Alternatively thereto, the functionality of the information carrier may also be implemented on the mobile device 10. The displays of such devices can display, for example, QR codes, bar codes, or color pattern codes. A reading device compatibility with the technology of the information carrier used reads, for example, an identification number from the information carrier.

The identification number is used in one embodiment in order to access a profile (data set) that has been created for the user of the information carrier, i.e., data is read out from a data set. Such a profile may store, for example, a destination floor and/or other person-specific information (e.g., VIP status, type of any kind of physical limitation (limited vision, wheelchair user)). The elevator control 32 can access this profile and therewith, for example, adapt the manner of operation of the elevator system 1 to a user with a physical limitation, for example, holding the elevator doors open longer so that a wheelchair user or a mobility-impaired user can board comfortably.

In one embodiment, the safety system 44 may also access this profile and recognize whether the person 8 whose mobile device 10 is accessing the database 47 has, for example, a physical limitation. If there is such a limitation, this information may also be involved in the ascertainment of the escape route for this person 8. Thus, for example, the escape route for a wheelchair user must not include any stairs; instead, an elevator ride should be included in the planning (provided that the elevator system 1 is operational) when the escape route requires changing floors.

The planning may be such that an elevator car 49 is moved to the floor on which the escape route proceeds, so as to, for example, already be ready to be boarded when the person 8 arrives there. If, however, vision is impaired, the escape route information is transmitted to the mobile device 10 together with a control command ensuring that the mobile device 10 conveys the escape route information audibly to the person.

Above, it is indicated that registered users have the ability to register special needs (e.g., because of a physical limitation) in advance, i.e., for example, to store same in a user profile. Alternatively thereto, information regarding such special needs may also be stored only locally with the user, e.g., on the mobile device 10 of the person 8, and only transmitted in actual use to, e.g., the elevator control 32. In another design, special needs may also be determined without prior registration or storage, e.g., via additional functions in the app or through analysis of a person's motion, e.g., how he or she moves or behaves (e.g., the person's travel speed (e.g., measuring the time to cover a known distance between two beacons) or use of stairs).

The building management system 42 and the safety system 44 are each microprocessor-controlled computer systems in which task-specific computer programs are executed. For illustration, FIG. 2 depicts the safety system 44 with an integrated computer system (μP) 44a. The building management system 42 generally takes on control tasks of the communication, housing technology, and danger alarm installations and simplifies the operation and supervision of these installations. It supports, in particular, the operator or administrator of a building in optional safety tasks; for example, in the case of an alarm, it automatically makes available detailed information in textual or graphic form for possible procedures at the alarm site. As other functions, for example, the building management system 42 gives alarm warnings for intervention teams or places to be notified, makes available overviews of the current danger situation, and records in-depth reports and activities carried out.

In the embodiment described here, the functionality of evacuating is implemented in the safety system 44. For this purpose, the safety system 44 is communicatively linked to the building management system 42 and, depending on the design, also to the elevator system 1, in order to control and monitor the safe and efficient evacuation of the building 2 in the event of an emergency. It shall be understood, however, that in another embodiment, the functionality of evacuating may also be implemented in the building management system 42 or elevator system 1, and that the aforementioned functionalities may be consolidated into one system. A separate representation of the safety system 44 may then be forgone.

With the understanding of the principal structure and functionalities of the building and systems thereof (in particular, the building management system 42, the fire alarm system, and the elevator system 1) described in connection with FIG. 1 to FIG. 4, there follows a description of embodiments of a method for evacuating the building 2, with reference to FIG. 5. A person skilled in the art will recognize that the schematic flow chart illustrated may comprise more or fewer steps, depending on a concrete embodiment. In connection with the description of FIG. 5, it is assumed that the mobile device 10 is a smartphone with an app activated, that the person 8 carries on a floor of the building 2, according to the situation illustrated by way of example in FIG. 1. The method is then executed, by way of example, in the computer-controlled safety system 44. The method according to FIG. 5 begins in a step S1 and ends in a step S8.

If the building management system 42 establishes by means of the fire alarms 6 that a fire has broken out in the building 2, it initiates an emergency procedure comprising, for example, warning people by means of acoustic and visual alarms, closing fire doors, and transferring the elevator systems 1 and the escalator installations 18 into an emergency mode. In such an emergency mode, for example, (destination) calls either cannot be entered or are ignored by the elevator control 32. The building management system 42 also sends an alarm signal to the safety system 44, which thereupon initiates evacuation of the building 2. The building management system 42 may also prompt, for example, the safety system 44 to send out automated notifications to the people 8 located in the building 2, or to the mobile devices 10, for example, with the request to leave the building 2. If the mobile device 10 receives the notification, the software application (app) may be activated thereby in one embodiment. Correspondingly, in one design, other people may also be informed, for example those who are not in the building 2 at the moment or may possible be en route to the building 2.

In a step S2, an instantaneous position of the mobile device 10 within the building 2 is determined. The positioning is done, as described above, by the mobile device 10 accessing the database 47 in which the identifier of the beacon 4 received by the mobile device 10 is linked to the location thereof in a dataset. The situation illustrated in FIG. 1 involves, for example, a communication link to the beacon 4 in the lobby close to the escalator installation 18 so that the mobile device 10 receives the identifier of this beacon 4.

A person skilled in the art will recognize that the step S2 may be executed independently of the step S1 and before the step S1. The position of the mobile device 10 may, for example, be determined and transmitted to the safety system 44 continuously and in the absence of any triggered evacuation.

In a step S3, a suitable escape route is determined on the basis of the position of the mobile device 10 determined in step S2. For this purpose, the safety system 44 executes a software program that calculates possible escape routes with the aid of the building model created for the building 2 and the information from the aforementioned evaluation of the situation parameters (e.g., the signals from the sensors and the fire alarms 6), the accesses to the database 47, and/or the evaluation of the user profile. The software program checks whether these escape routes are in principle available and are not possibly blocked or overloaded, and whether they are suitable for the person 8 in light of any possible physical limitations. From the resulting possible escape routes, the software program selects the escape route that guides the person 8 to the destination in the fastest and safest manner. Methods for calculating escape routes within buildings are known, for example, from Pu, S. and Zlatanova, S., "Evacuation Route Calculation of Inner Buildings," in "Geo-Information for Disaster Management," First International Symposium on Disaster Management, pp. 1143-1161, Springer Publishing, 2005. This publication describes, inter alia, creating 3-D building models and taking into account factors that may change during an emergency, e.g., a damage stage (e.g., blocked routes), power failure, and reduced capacity of escape routes.

In a step S4, information on the determined escape route is transmitted to the mobile device 10 in order to therewith help the person to quickly and safely leave the building 2. The information may be represented so as to be readable for the person 8 on the display 52, e.g., as text and/or graphics. In addition or alternatively thereto, the information may also be presented to the person 8 as an audio message.

However, the method does not yet end with the transmission of the escape route information in step S4. The technology described here is, namely, designed so as to monitor whether the person 8 also actually reaches the destination, i.e., the gathering point 12. In one embodiment (not shown), the method proceeds from step S4 directly to a step S7. In the step S7, the person 8 has reached the destination; a communication link that is registered in the safety system 44 is established between the mobile device 10 borne by the person and the beacon 4 present at the gathering point 12. The person 8 is considered as having been "evacuated."

Figure 5:
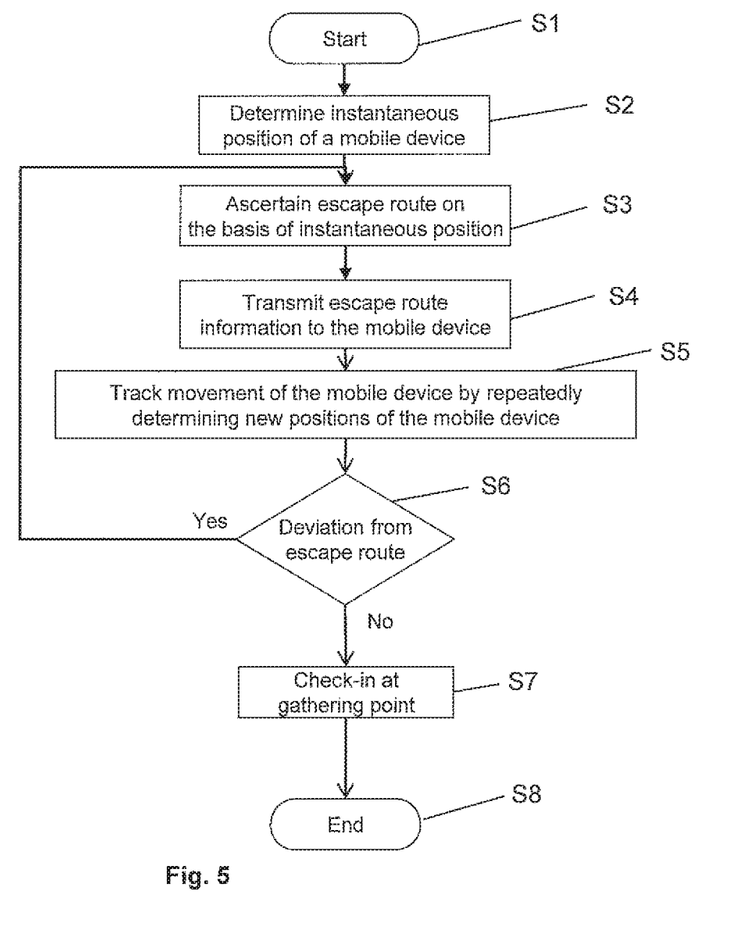
FIG. 5 illustrates an example of a representation of a method for evacuating a building on the basis of a schematic flow chart.

In the embodiment depicted in FIG. 5, each communication link of the mobile device 10 to a beacon 4 continues to be detected after step S4. If the person 8 moves away from the position determined in step S2, a new communication link is established with another beacon 4, and the new position of the mobile device 10 in the building 2 is determined. In a step S5, thus, the movement of the mobile device 10 is tracked through determination of new positions of the mobile device 10, e.g., until the person 8 is registered at the destination as "evacuated."

In one embodiment (not shown), the method proceeds from step S5 directly to a step S7.

The technology described here makes it possible to recognize deviations from the escape route through tracking of the movement of the mobile device 10. A corresponding embodiment is illustrated in FIG. 5: A step S6 involves checking whether a newly determined position of the mobile device 10 deviates from the escape route determined in step S3. If there is no deviation, the method proceeds along the no-branch to step S7. In the step S7, the person 8 has reached the destination, i.e., the gathering point 12; a communication link that is registered in the safety system 44 is established between the mobile device 10 borne by the person and the beacon 4 present at the gathering point 12. The person 8 is considered thus as having been "evacuated."

If there is a deviation in the step S6, the method proceeds along the yes-branch to step S3. A deviation may occur when the person 8 gets lost, for example due to poor visibility and/or panicking, or when the person 8 must change course because the escape route provided has become blocked or overloaded in the meantime.

In the step S3, a new escape route is determined on the basis of the position determined in the step S5. The new escape route is determined as described above in connection with step S3. Thereafter, in step S4, the new escape route information is transmitted to the mobile device 10, as described above. If the person 8 follows the new escape route, he or she reaches the gathering point 12 and is registered there, as has been described in connection with step S7.

The new escape route information may, for example, request that the person turn back in order to return back to the originally determined escape route. This may be the case, for example, when it is quickly recognized that there is a deviation and that the person has strayed only slightly from the escape route. The newly determined escape route therefore comprises the route back (i.e., the route back to the original escape route) and the original escape route (or the remaining part of the original escape route). If, on the other hand, the person 8 has continued to stray from the escape route, an escape route that either does not coincide or coincides only partially with the original escape route may be determined from the instantaneous location. From the person 8's perspective, this is still the current escape route information, irrespective of whether and how the original escape route needed to be updated.

If the escape route is updated, the person 8's attention may be brought thereto, for example, through a warning notice, in order to ensure that the person 8 also takes note of the warning notice. For this purpose, a corresponding message may be sent to the mobile device 10. The mobile device 10 responds by generating an audible signal or notification, a readable notification, and/or vibration of the mobile device 10.

The invention claimed is:

1. A method for controlling a safety system for guiding a person during an evacuation situation in an area equipped with an elevator system, in which a plurality of fixed point markers have been arranged at fixed locations, wherein the fixed point markers store data that is received by a mobile device carried by the person, comprising:
   determining an instantaneous position of the mobile device in the area when the mobile device, by means of an identifier received from a first fixed point marker, accesses a database in which the identifier is linked to a location of the first fixed point marker;
   ascertaining an escape route in the area to a destination on the basis of the instantaneous position of the mobile device;
   transmitting escape route information to the mobile device; and
   registering the person on reaching the destination when the mobile device is detected at the destination by means of a second fixed point marker.

2. The method according to claim 1, further comprising: determining new positions of the mobile device in order to track a change in position of the mobile device.

3. The method according to claim 2, further comprising: determining whether a newly determined position deviates from the escape route.

4. The method according to claim 2, further comprising:
determining a new escape route on the basis of the newly determined position and transmitting new escape route information to the mobile device.

5. The method according to claim 3, further comprising: sending a warning notice to the mobile device when there is new escape route information.

6. The method according to claim 1, in which the fixed point markers are equipped with Bluetooth technology.

7. The method according to claim 1, further comprising: determining whether the person has a physical limitation.

8. The method according to claim 7, in which, if the person has a physical limitation, the escape route is also determined on the basis of this physical limitation.

9. The method according to claim 8, in which the determined escape route comprises use of the elevator system when the person has limited mobility.

10. The method according to claim 7, in which whether a person has a physical limitation is determined by means of access to a user profile in which a physical limitation has been registered or by means of analysis of the person's movement.

11. The method according to claim 7, in which escape route information is transmitted to the mobile device with a command to convey the escape route information to the person audibly if the physical limitation is limited vision.

12. The method according to claim 1, further comprising: controlling the elevator system in accordance with the determined escape route, in order to transport an elevator car to a floor on which the determined escape route proceeds.

13. The method according to claim 1, in which the escape route is also determined on the basis of a current situation parameter, wherein a situation parameter is determined by means of a plurality of sensors present in the area.

14. A system for guiding a person during an evacuation situation in an area equipped with an elevator system, comprising:
a plurality of fixed point markers each at a defined site, wherein the fixed point markers store an identifier that is received by a mobile device carried by the person; and
a safety system with a processor and a memory for storing instructions, which when executed by the processor cause the processor to:
determine an instantaneous position of the mobile device in the area when the mobile device, by means of an identifier received from a first fixed point marker, accesses a database in which the identifier is linked to a location of the first fixed point marker,
ascertain an escape route in the area to a destination, the determination being based on the instantaneous position of the mobile device,
transmits escape route information to the mobile device, and
registers the person on reaching the destination when the mobile device is detected at the destination by means of a second fixed point marker.

15. The system according to claim 14, in which the fixed point markers are equipped with Bluetooth technology and emit an identifier that the mobile device receives when in radio range.

16. The system according to claim 14, in which a fixed point marker is arranged in an elevator car of the elevator system.

17. The system according to claim 14, further comprising:
a plurality of sensors in the area with which situation parameters are determined, wherein a situation parameter is used to determine the escape route.

* * * * *